US012592391B2

(12) United States Patent
Kintsu et al.

(10) Patent No.: US 12,592,391 B2
(45) Date of Patent: Mar. 31, 2026

(54) ELECTRODE MANUFACTURING METHOD, ELECTRODE CURRENT COLLECTOR, AND ELECTRODE

(71) Applicant: TOYOTA JIDOSHA KABUSHIKI KAISHA, Aichi-ken (JP)

(72) Inventors: Yusuke Kintsu, Miyoshi (JP); Tetsuya Mimura, Chiryu (JP); Haruka Shionoya, Toyota (JP); Yasuhiro Sakashita, Toyota (JP); Takeshi Kondo, Kariya (JP); Tomoyuki Tasaki, Kariya (JP); Yuta Kawamoto, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 593 days.

(21) Appl. No.: 17/981,184

(22) Filed: Nov. 4, 2022

(65) Prior Publication Data

US 2023/0223549 A1 Jul. 13, 2023

(30) Foreign Application Priority Data

Jan. 11, 2022 (JP) ................................. 2022-002209

(51) Int. Cl.
*H01M 4/66* (2006.01)
*H01M 4/04* (2006.01)
(52) U.S. Cl.
CPC ......... *H01M 4/667* (2013.01); *H01M 4/0404* (2013.01)
(58) Field of Classification Search
CPC .................................................... H01M 4/667
See application file for complete search history.

(56) References Cited

U.S. PATENT DOCUMENTS

2011/0091754 A1* 4/2011 Miyahisa .............. H01M 50/46
429/94
2016/0141197 A1* 5/2016 Usugi ........................ C09J 5/00
156/701
2019/0386331 A1 12/2019 Lin et al.

FOREIGN PATENT DOCUMENTS

CN 102017237 A 4/2011
EP 0 967 672 A1 12/1999
JP 2000-30694 A 1/2000
JP 2000030694 A * 1/2000
JP 2010-186738 A 8/2010
JP 2013-17962 1/2013
JP 2017-157495 9/2017
JP 2021-44096 3/2021

(Continued)

OTHER PUBLICATIONS

English Translation of JP2000030694A (Year: 2000).*

*Primary Examiner* — Jeffrey T Barton
(74) *Attorney, Agent, or Firm* — Sughrue Mion, PLLC

(57) ABSTRACT

An electrode is manufactured by forming an active material layer on a surface of an electrode current collector, forming a groove portion on a surface of the active material layer, and peeling off a part of the active material layer. An electrode current collector includes a metal foil and an adhesive layer. The metal foil includes a first region and a second region. The adhesive layer covers the first region. In the second region, the metal foil is exposed. The active material layer includes a first portion that covers the adhesive layer and a second portion that covers the second region. The groove portion is formed in each of the first portion and the second portion. The second portion is peeled off.

5 Claims, 11 Drawing Sheets

(56)       References Cited

FOREIGN PATENT DOCUMENTS

| | | | |
|---|---|---|---|
| JP | 2022-93073 | A | 6/2022 |
| WO | 98/48466 | A1 | 10/1998 |

* cited by examiner

ELECTRODE MANUFACTURING METHOD, ELECTRODE CURRENT COLLECTOR, AND ELECTRODE

CROSS-REFERENCE TO RELATED APPLICATION

This application claims priority to Japanese Patent Application No. 2022-002209 filed on Jan. 11, 2022, incorporated herein by reference in its entirety.

BACKGROUND

1. Technical Field

The present disclosure relates to an electrode manufacturing method, an electrode current collector, and an electrode.

2. Description of Related Art

Japanese Unexamined Patent Application Publication No. 2013-017962 discloses a functional sheet coating device having excellent linearity at start and end portions of coating during intermittent coating.

SUMMARY

An electrode can be manufactured by forming an active material layer on a surface of an electrode current collector. The active material layer may be formed intermittently. The surface of the electrode current collector is exposed in a portion where the active material layer is not formed. Hereinafter, a portion where the surface of the electrode current collector is exposed is also referred to as an "exposed region". The exposed region can function as a reserve space for cutting of the electrode, a welded portion of a current collecting member, and the like.

Due to the intermittent formation of the active material layer, the shape of the end portion (periphery) of the active material layer may be disordered. The disordered end portion shape can, for example, reduce battery performance.

The present disclosure provides an electrode manufacturing method capable of intermittently forming an active material layer.

Hereinafter, technical configurations and action effects of the present disclosure will be described. However, the action mechanism of the present specification includes estimation. The action mechanism does not limit the technical scope of the present disclosure.

An electrode manufacturing method according to a first aspect of the present disclosure includes manufacturing an electrode by forming an active material layer on a surface of an electrode current collector, forming a groove portion on a surface of the active material layer, and peeling off a part of the active material layer. In planar view, the electrode current collector includes a metal foil and an adhesive layer. The metal foil includes a first region and a second region. The adhesive layer covers the first region. The second region is adjacent to the first region. In the second region, the metal foil is exposed. The active material layer is formed to include a first portion and a second portion. The second portion is adjacent to the first portion. The first portion covers the adhesive layer. The second portion covers the second region. The groove portion is formed in each of the first portion and the second portion. As the part of the active material layer, the second portion is peeled off.

The electrode current collector includes the first region and the second region. The first region is the region where the active material layer is arranged in the electrode. The second region is an exposed region in the electrode. The first region is covered with the adhesive layer.

The active material layer includes the first portion and the second portion. The first portion is formed on the first region (adhesive layer). The second portion is formed on the second region (metal foil). The groove portion is formed in the active material layer. The groove portion is formed in each of the first portion and the second portion. The adhesive layer is between the first portion and the metal foil. Due to the formation of the groove portion, the first portion is firmly adhered to the metal foil. That is, the peel strength of the first portion can be improved. On the other hand, there is no adhesive layer between the second portion and the metal foil. The formation of the groove portion makes the second portion weak, so the peel strength of the second portion may rather decrease.

Due to the difference in peel strength between the first portion and the second portion, the second portion can be easily peeled. By peeling off the second portion, the first portion (active material layer) with a less disordered end portion shape remains according to the planar shape of the first region (adhesive layer). That is, the active material layers can be formed intermittently.

In the first aspect, the forming of the active material layer may include preparing a wet powder, processing the wet powder into the active material layer by roll forming, and arranging the active material layer on the surface of the electrode current collector.

In the configuration, the active material layer can be formed by any method. For example, the active material layer may be formed by applying a slurry.

For example, the active material layer may be formed by roll forming of a wet powder. The wet powder is an aggregate of grains. In roll forming, a sheet (active material layer) is formed by spreading the aggregate of grains, so that the shape of the end portion tends to be disordered. In the manufacturing method, even when the work is a wet powder, the disorder of the end portion shape can be reduced.

In the first aspect, a part of the groove portion may be formed along a boundary between the first portion and the second portion.

The groove portion along the boundary between the first portion and the second portion can act like a cut line (perforation) when the second portion is peeled off. It is expected that the disorder of the end portion shape will be further reduced in the first portion (final active material layer) by having a part of the groove portion function as a cut line.

In the first aspect, the part of the active material layer may be peeled by applying vibration to the second portion.

The second portion is expected to be peeled by a weak stimulus. For example, vibration may be applied to the second portion.

An electrode current collector according to a second aspect of the present disclosure includes a metal foil and an adhesive layer. In planar view, the metal foil includes a first region and a second region. The adhesive layer covers the first region. The second region is adjacent to the first region. In the second region, the metal foil is exposed.

The electrode current collector is suitable as the electrode current collector according to the first aspect.

In the second aspect, in the planar view, the metal foil may have a strip-shaped planar shape. In a longitudinal direction of the metal foil, the first region and the second region may be alternately arranged.

In the second aspect, in the planar view, the first region may have a rectangular planar shape.

In the second aspect, in the planar view, the second region may surround the first region.

An electrode according to a third aspect of the present disclosure includes the electrode current collector and an active material layer. The active material layer covers the adhesive layer. A groove portion is formed on a surface of the active material layer. An end surface of the active material layer has an inclination angle of 45 degrees or more.

In the electrode manufactured by the manufacturing method, the shape of the end portion of the active material layer (first portion) is less disordered. The active material layer can have, for example, a steep end surface. That is, the end surface of the active material layer can have an inclination angle of 45 degrees or more. The steep end surface of the active material layer is expected to improve the energy density, for example.

Hereinafter, an embodiment of the present disclosure (which hereinafter may be abbreviated as "the present embodiment") will be described. However, the present embodiment does not limit the technical scope of the present disclosure.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

4

Figure 16:
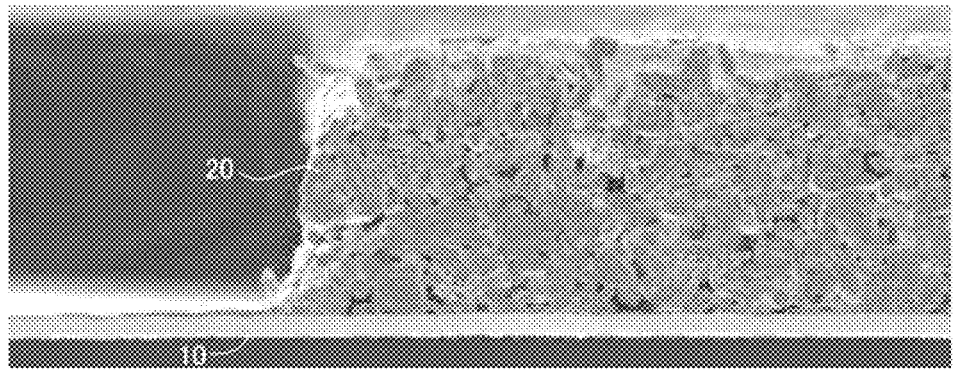
Figure 17:
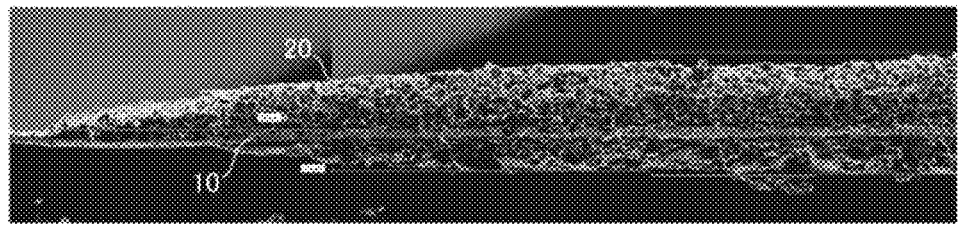

FIG. 16 is an image illustrating an application example of the present embodiment; and FIG. 17 is an image illustrating a reference form.

DETAILED DESCRIPTION OF EMBODIMENTS

Definition of Terms

In the present specification, the description of "including", "containing", "having", and variations thereof (for example, "constituted of") is in an open-ended format. The open-ended format may or may not include additional elements in addition to the required elements. The description "consisting of" is in a closed format. However, even in the closed format, additional elements that are normally associated impurities or that are irrelevant to the disclosed art are not excluded. The description of "substantially consists of . . . " is in a semi-closed format. In the semi-closed format, the addition of elements that do not substantially affect the basic and novel properties of the disclosed art is permissible.

In the present specification, expressions such as "may" and "can" are used in the permissive meaning of "there is a possibility" rather than the obligatory meaning of "it must be done".

In the present specification, the execution order of a plurality of steps, movements, operations, and the like included in various methods is not limited to the description order, unless otherwise specified. For example, a plurality of steps may proceed simultaneously. For example, a plurality of steps may be in phase with each other.

In the present specification, a numerical range such as "m % to n %" includes an upper limit value and a lower limit value, unless otherwise specified. That is, "m % to n %" indicates a numerical range of "m % or more and n % or less". Further, "m % or more and n % or less" includes "more than m % and less than n %". Further, a numerical value randomly selected from the numerical range may be set as a new upper limit value or a lower limit value. For example, a new numerical range may be set by appropriately combining a numerical value within the numerical range with a numerical value described in another part in the present specification, in a table, in a figure, or the like.

In the present specification, all numerical values are modified by the term "about". The term "about" can mean, for example, +5%, +3%, +1%, and the like. All numerical values can be approximate values that can change depending on the usage pattern of the disclosed art. All numbers may be displayed in significant figures. The measured value can be an average value in multiple measurements. The number of measurements may be three or more, five or more, or ten or more. Generally, it is expected that the reliability of the average value improves as the number of measurements increases. The measured value may be rounded off based on the number of significant digits. The measured value may include, for example, an error due to a detection limit of a measuring device.

Geometric terms (for example, "parallel", "vertical", and "orthogonal") in the present specification should not be understood in a strict sense. For example, "parallel" may deviate slightly from "parallel" in the strict sense. Geometric terms in the present specification can include, for example, tolerances or errors in design, work, and manufacturing. The dimensional relationships in each drawing may not match the actual dimensional relationships. In order to help the understanding of the disclosed art, the dimensional relations (length, width, thickness, and the like) in each drawing may be changed. Furthermore, some configurations may be omitted.

As used in the present specification, "planar view" indicates that a target object is viewed with a line of sight parallel to a thickness direction of the target object. The planar view is drawn on the plan view. As used in the present specification, "cross-sectional view" indicates that a target object is viewed with a line of sight orthogonal to the thickness direction of the target object. The cross-sectional view is drawn in the cross-sectional diagram.

As used in the present specification, the "inclination angle" indicates the angle (acute angle and right angle) formed by an end surface of an active material layer and a surface of an electrode current collector in a cross-sectional view.

In the present specification, when a compound is represented by a stoichiometric composition formula (for example, "LiCoO$_2$"), the stoichiometric composition formula is only a representative example of the compound. The compound may have a non-stoichiometric composition. For example, when lithium cobalt oxide is described as "LiCoO$_2$", unless otherwise specified, lithium cobalt oxide is not limited to the composition ratio of "Li/Co/O=1/1/2" and can include Li, Co, and O in any composition ratio. Furthermore, doping, substitution, and the like with trace elements can be allowed.

As used in the present specification, the term "electrode" is a general term for a positive electrode and a negative electrode. The electrode may be a positive electrode or a negative electrode. The electrode can be applied to any battery system. The electrode may be, for example, for a lithium ion battery.

As used in the present specification, the term "solid fraction" indicates the total mass fraction (percentage) of components other than the liquid material in a solid-liquid mixture. The solid fraction can also be referred to as "nonvolatile content (NV)". A component (solute) dissolved in a liquid material is considered to be a component other than the liquid material.

As used in the present specification, the term "slurry" refers to a dispersion system in which a solid material (powder) is dispersed in a liquid material. The term "wet powder" indicates a dispersion system in which a liquid material is dispersed in a solid material (powder).

As used in the present specification, "D50" is defined as a particle size in which the cumulative frequency from the smaller particle size reaches 50% in the volume-based particle size distribution. The volume-based particle size distribution can be measured by a laser diffraction type particle size distribution measuring device.

Electrode Manufacturing Method

Figure 1:
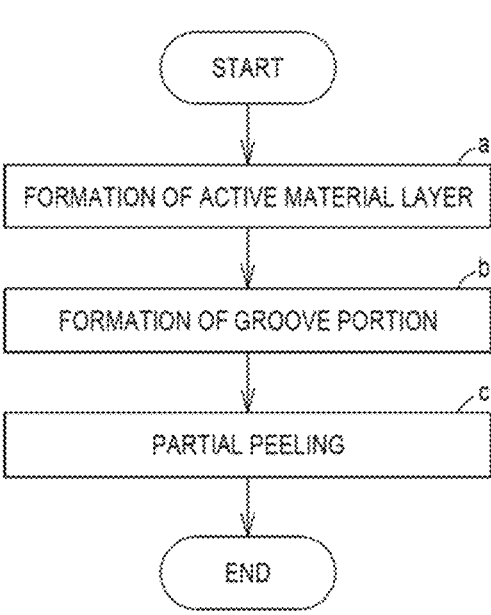
FIG. 1 is a schematic flowchart of an electrode manufacturing method according to an embodiment.

FIG. 1 is a schematic flowchart of an electrode manufacturing method according to a present embodiment. Hereinafter, the "electrode manufacturing method in the present embodiment" may be abbreviated as "the present manufacturing method". The present manufacturing method includes "(a) formation of active material layer", "(b) formation of groove portion", and "(c) partial peeling".

(a) Formation of Active Material Layer

The present manufacturing method includes forming an active material layer on a surface of an electrode current collector.

Electrode Current Collector

Figure 2:
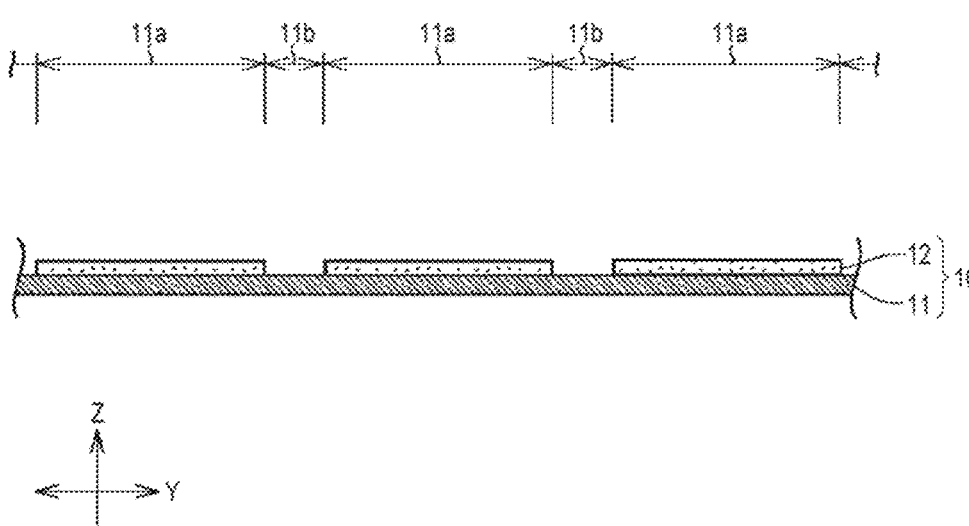
FIG. 2 is a first schematic cross-sectional diagram illustrating an electrode manufacturing process.

FIG. 2 is a first schematic cross-sectional view illustrating an electrode manufacturing process. The electrode current collector 10 is prepared. The electrode current collector 10 is a sheet-shaped base material. The electrode current collector 10 includes a metal foil 11 and an adhesive layer 12.

The metal foil 11 has a current collecting function. The metal foil 11 may have a thickness of, for example, 5 µm to 50 µm. The metal foil 11 may include, for example, at least one selected from the group consisting of aluminum (Al), copper (Cu), nickel (Ni), iron (Fe), chromium (Cr), and titanium (Ti). The metal foil 11 may include, for example, Al foil, Al alloy foil, Cu foil, Ni foil, stainless steel foil, and the like.

Figure 3:
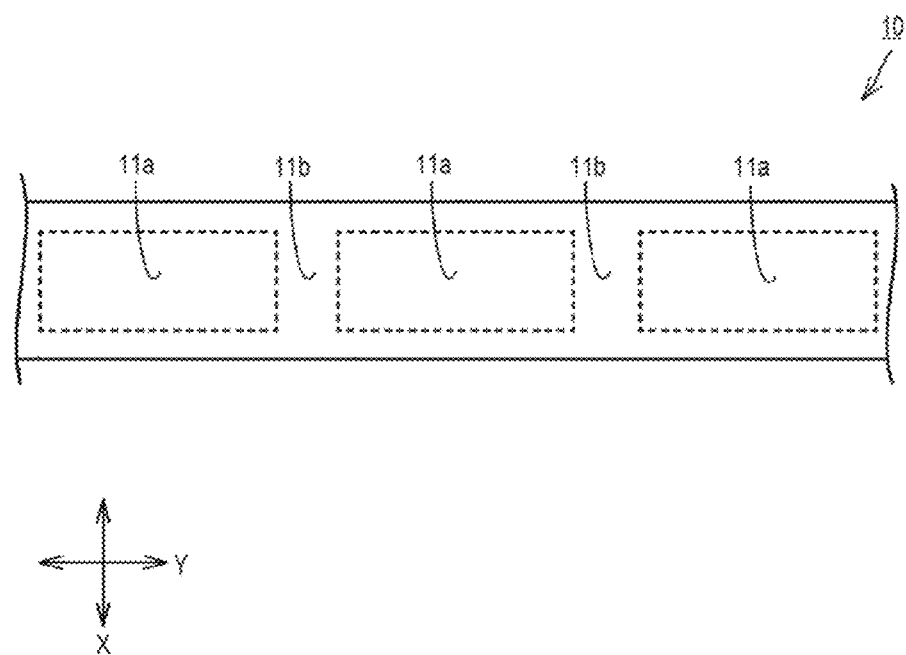
FIG. 3 is a schematic plan view illustrating an example of a metal foil.

FIG. 3 is a schematic plan view illustrating an example of the metal foil. In a planar view, the metal foil 11 may have, for example, a strip-shaped planar shape. The metal foil 11 includes a first region 11a and a second region 11b. In a longitudinal direction (Y-axis direction) of the metal foil 11, the first region 11a and the second region 11b may be alternately arranged.

In the first region 11a, an active material layer is arranged at the electrode. The first region 11a can have any planar shape. In planar view, the first region 11a may have, for example, a rectangular planar shape.

The second region 11b is an exposed region in the electrode. In the second region 11b, the metal foil 11 is exposed. The second region 11b is adjacent to the first region 11a. In planar view, the second region 11b may surround, for example, the first region 11a.

The adhesive layer 12 covers the first region 11a (see FIG. 2). The adhesive layer 12 bonds the active material layer to the metal foil 11. The adhesive layer 12 may have a thickness of, for example, 0.1 µm to 5 µm. The adhesive layer 12 can include any adhesive. The adhesive layer 12 may include, for example, at least one selected from the group consisting of styrene butadiene rubber (SBR), carboxymethyl cellulose (CMC), polyacrylic acid (PAA), polyvinyl alcohol (PVA), polytetrafluoroethylene (PTFE), polyvinylidene fluoride (PVdF), and vinylidene fluoride-hexafluoropropylene copolymer (PVdF-HFP). The adhesive layer 12 may further include, for example, a conductive material or the like in addition to the adhesive material. The conductive material may include, for example, carbon black or the like.

The adhesive layer 12 can be formed by any method. For example, an adhesive composition including an adhesive may be made. For example, an adhesive composition may be made by mixing a liquid material (solvent or dispersion medium) with an adhesive. The adhesive composition may be a solution or a particle dispersion. The mass fraction of the adhesive in the adhesive composition can be adjusted so that the adhesive composition exhibits the desired viscosity. The mass fraction of the adhesive may be, for example, 1% to 50%. Depending on the type of adhesive, a suitable liquid material can be selected. The liquid material may include, for example, at least one selected from the group consisting of water, N-methyl-2-pyrrolidone (NMP), and butyl butyrate.

For example, the adhesive composition may be intermittently applied to the surface of the metal foil 11 by a die coater. By drying the adhesive composition, the adhesive layer 12 can be formed. That is, the first region 11a and the second region 11b can be formed.

Slurry

For example, the active material layer may be formed by applying a slurry to the surface of the electrode current collector 10. For example, the slurry may be applied by a die coater. The slurry can be formed, for example, by mixing an active material, a conductive material, a binder, and a liquid material. The solid fraction of the slurry may be, for example, 50% to 70% or 50% to 65%.

Wet Powder

Figure 4:
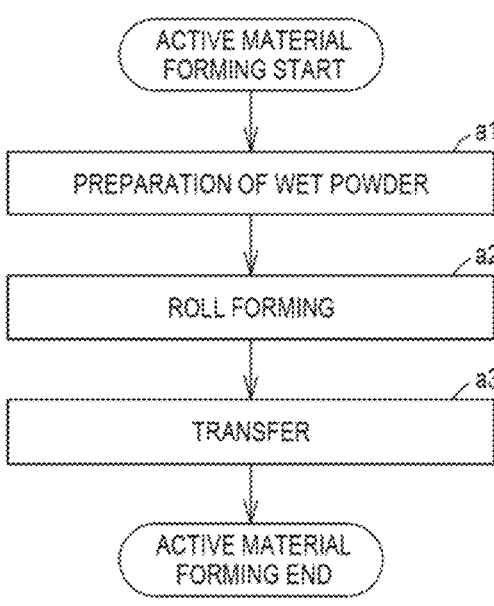
FIG. 4 is a schematic flowchart illustrating an example of an active material layer forming method.

FIG. 4 is a schematic flowchart illustrating an example of an active material layer forming method. "(a) formation of active material layer" may include, for example, "(a1) preparation of wet powder", "(a2) roll forming", and "(a3) transfer".

(a1) Preparation of Wet Powder

The present manufacturing method may include preparing a wet powder. For example, a wet powder can be formed by mixing an active material, a binder, a conductive material, and a liquid material. For example, the materials may be mixed by a stirring granulator. The solid fraction of the wet powder may be, for example, 70% to 99% or 75% to 90%.

The active material may be, for example, spherical, lumpy, flake-shaped, or columnar. The active material can have any size. The active material may have, for example, a D50 of 1 μm to 30 μm or a D50 of 5 μm to 20 μm.

The active material may be, for example, a positive electrode active material. The positive electrode active material can store and release lithium (Li) ions at a higher potential than that of a negative electrode active material. The positive electrode active material can include any component. The positive electrode active material may include, for example, at least one selected from the group consisting of $LiCoO_2$, $LiNiO_2$, $LiMnO_2$, $LiMn_2O_4$, Li(Ni-CoMn)$O_2$, Li(NiCoAl)$O_2$, and $LiFePO_4$. For example, "(NiCoMn)" in "Li(NiCoMn)$O_2$" indicates that the total composition ratio in parentheses is 1. The amount of individual components is freely selected as long as the total is 1. Li(NiCoMn)$O_2$ may include, for example, $Li(Ni_{1/3}Co_{1/3}Mn_{1/3})O_2$, $Li(Ni_{0.5}Co_{0.2}Mn_{0.3})O_2$, $Li(Ni_{0.8}Co_{0.1}Mn_{0.1})O_2$.

The negative electrode active material can store and release Li ions at a lower potential than that of the positive electrode active material. The negative electrode active material can include any component. The negative electrode active material may include, for example, at least one selected from the group consisting of graphite, soft carbon, hard carbon, silicon, silicon oxide, silicon-based alloy, tin, tin oxide, tin-based alloy, and $Li_4Ti_5O_{12}$.

The binder may be soluble or insoluble in the liquid material. The blending amount of the binder may be, for example, 0.1 parts by mass to 10 parts by mass with respect to 100 parts by mass of the active material. The binder can include any component. The binder may include, for example, at least one selected from the group consisting of PVdF, PTFE, PVdF-HFP, SBR, CMC, and PAA.

The blending amount of the conductive material may be, for example, 0.1 parts by mass to 10 parts by mass with respect to 100 parts by mass of the active material. The conductive material can include any component. The conductive material may include, for example, at least one selected from the group consisting of carbon black, vapor-grown carbon fibers, carbon nanotubes, and graphene flakes. The carbon black may include, for example, at least one selected from the group consisting of acetylene black, furnace black, channel black, and thermal black.

(a2) Roll Forming

The present manufacturing method may include processing the wet powder into an active material layer by roll forming.

Figure 5:
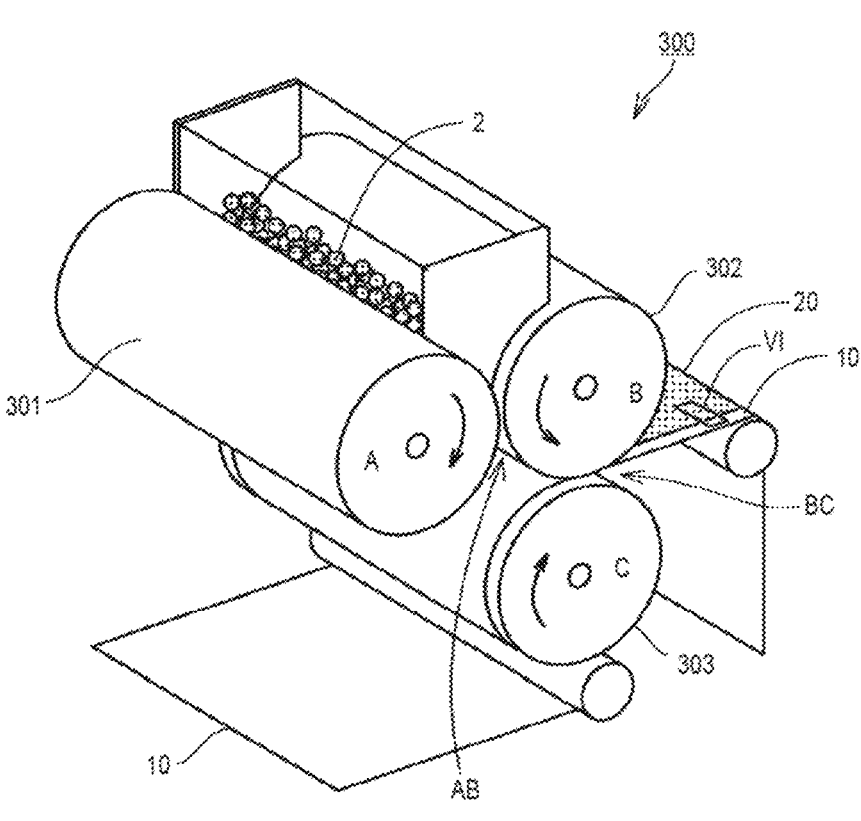
FIG. 5 is a schematic view illustrating an example of a film forming apparatus.
Figure 5:

FIG. 5 is a schematic view illustrating an example of a film forming apparatus. A film forming apparatus 300 can process a wet powder 2 into an active material layer 20. The film forming apparatus 300 includes a first roll 301, a second roll 302, and a third roll 303. Each roll rotates in the direction of the arrow. Rotation axes of the rolls are parallel to each other. When the rotation speed of the first roll 301 is ω1, the rotation speed of the second roll 302 is ω2, and the rotation speed of the third roll 303 is ω3, for example, the relationship of "ω1<ω2<ω3" may be satisfied.

A gap AB is formed between the first roll 301 and the second roll 302. The wet powder 2 is supplied to the gap AB. In the gap AB, the wet powder 2 is compacted and spread to form the active material layer 20 (sheet). The active material layer 20 may have a thickness of, for example, 10 μm to 500 μm, or may have a thickness of 50 μm to 200 μm.

(a3) Transfer

The present manufacturing method may include placing the active material layer 20 on the surface of the electrode current collector 10. For example, the film forming apparatus 300 may transfer the active material layer 20 to the electrode current collector 10. A gap BC is formed between the second roll 302 and the third roll 303. The second roll 302 conveys the active material layer 20 to the gap BC. The third roll 303 conveys the electrode current collector 10 to the gap BC.

In the gap BC, the active material layer 20 is rubbed against the surface of the electrode current collector 10. As a result, the active material layer 20 adheres to the surface of the electrode current collector 10. That is, the active material layer 20 is arranged on the surface of the electrode current collector 10.

Figure 6:
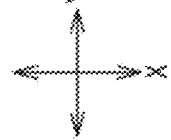
FIG. 6 is an image illustrating an example of an end portion shape.

FIG. 6 is an image illustrating an example of the end portion shape. FIG. 6 illustrates a portion corresponding to the region VI of FIG. 5. In the method of forming the active material layer 20 with the wet powder, the shape of the end portion in a width direction (X-axis direction) tends to be disordered.

Figure 7:
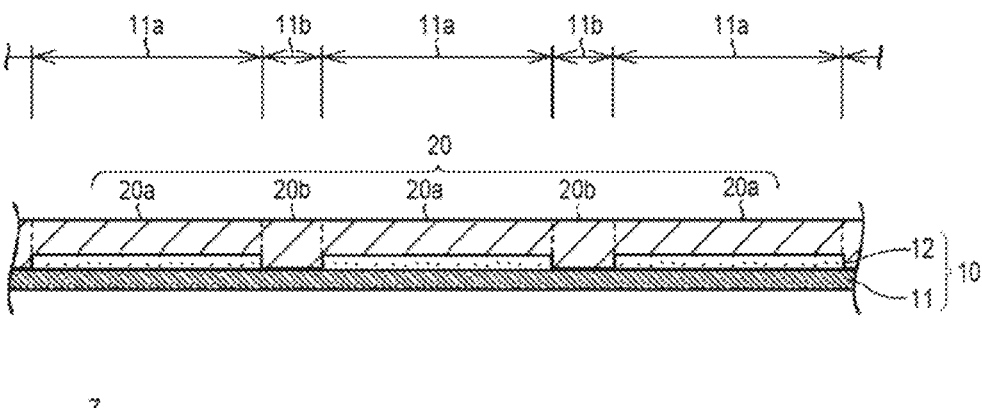
FIG. 7 is a second schematic cross-sectional diagram illustrating an electrode manufacturing process.
Figure 7:
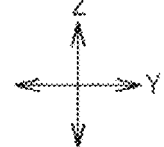

FIG. 7 is a second schematic cross-sectional view illustrating an electrode manufacturing process. The active material layer 20 is formed so as to include a first portion 20a and a second portion 20b. The second portion 20b is adjacent to the first portion 20a. The first portion 20a covers the adhesive layer 12 (first region 11a). The second portion 20b covers the second region 11b. The active material layer 20 may be formed so as to cover the entire surface of the electrode current collector 10, for example.

(b) Formation of Groove Portion

Figure 8:
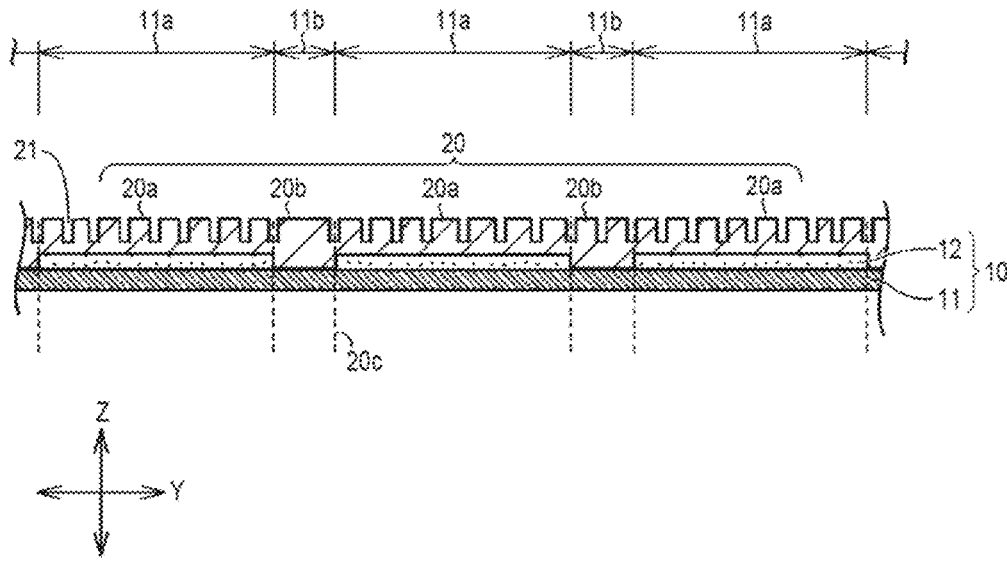
FIG. 8 is a third schematic cross-sectional diagram illustrating an electrode manufacturing process.

FIG. 8 is a third schematic cross-sectional view illustrating an electrode manufacturing process. The present manufacturing method includes forming a groove portion 21 on the surface of the active material layer 20. The groove portion 21 can be formed, for example, by embossing. That is, the groove portion 21 (recess portion) may be formed by pressing a convex shape against the surface of the active material layer 20. For example, an embossed roll may be used.

After forming the groove portion 21, the active material layer 20 may be dried. The active material layer 20 can be dried by any method. For example, a hot air drying oven may be used.

The groove portion 21 can function as, for example, a flow path for the electrolytic solution. It is expected that the formation of the groove portion 21 will improve the battery performance (for example, cycle characteristics). The cross-sectional shape of the groove portion 21 is freely selected. The cross-sectional shape of the groove portion 21 may be rectangular, U-shaped, or V-shaped. The groove portion 21 may have a depth of, for example, 10 μm to 150 μm. The ratio of the depth of the groove portion 21 to the thickness of the active material layer 20 may be, for example, 0.1 to 0.9 or 0.3 to 0.7.

The groove portion 21 can be formed in each of the first portion 20a and the second portion 20b. By forming the groove portion 21 in the first portion 20a, the peel strength of the first portion 20a can be improved. By forming the groove portion 21 in the second portion 20b, the peel strength of the second portion 20b can be reduced.

A part of the groove portion 21 may be formed along a boundary 20c between the first portion 20a and the second portion 20b. The portion of the groove portion 21 along the boundary 20c can function as a cut line of the active material layer 20. The boundary 20c can be located directly above a boundary between the first region 11a and the second region 11b. A part of the groove portion 21 may extend linearly along the boundary 20c. A part of the groove portion 21 may substantially coincide with the position of the boundary 20c. A part of the groove portion 21 can function as a cut line even when it is slightly separated from the boundary 20c. The distance between a part of the groove portion 21 and the boundary 20c may be, for example, 0 mm to 10 mm.

Figure 9:
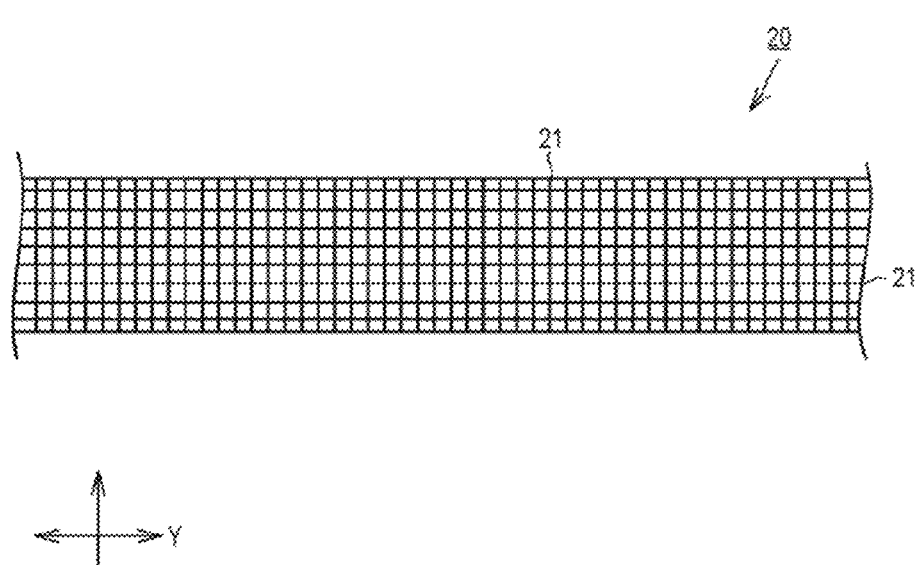
FIG. 9 is a schematic plan view illustrating an example of a groove portion.

FIG. 9 is a schematic plan view illustrating an example of the groove portion. The groove portion 21 can have any planar pattern. The groove portion 21 may be formed in a numerously-lined shape, for example. The groove portion 21 may be formed in a grid pattern shape, for example. The pitch (interval between adjacent parallel lines) of the groove portion 21 may be, for example, 0.1 mm to 10 mm or 0.5 mm to 5 mm.

(c) Partial Peeling

Figure 10:
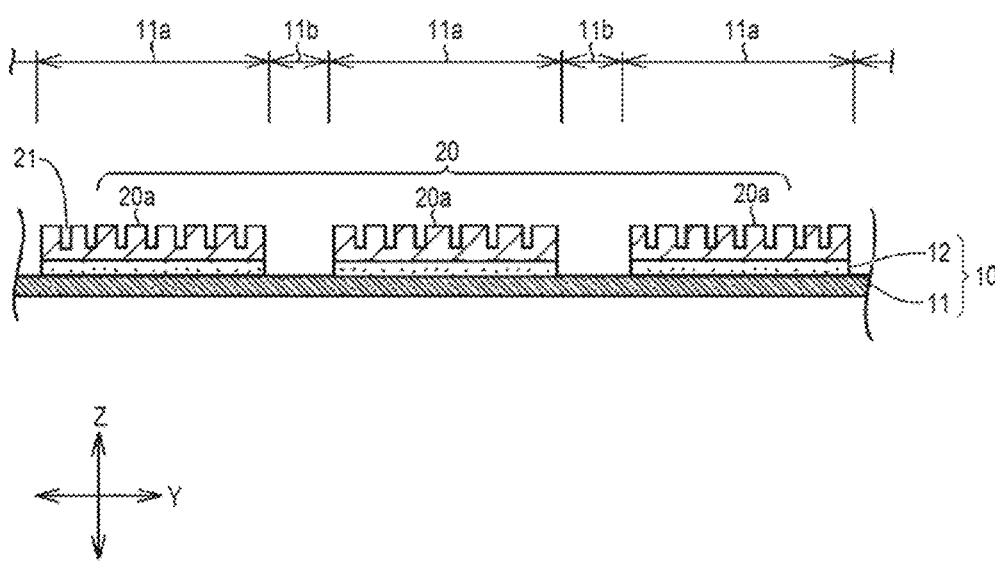
FIG. 10 is a fourth schematic cross-sectional diagram illustrating an electrode manufacturing process.

FIG. 10 is a fourth schematic cross-sectional view illustrating an electrode manufacturing process. The present manufacturing method includes peeling a part of the active material layer 20. That is, the second portion 20b is peeled off. Since the peel strength of the second portion 20b is low; the second portion 20b can be peeled by a weak stimulus. For example, vibration may be applied to the second portion 20b. For example, the second portion 20b may be sucked by a suction pump. The peeled second portion 20b may be reused as a raw material for the wet powder, for example.

Figure 11:
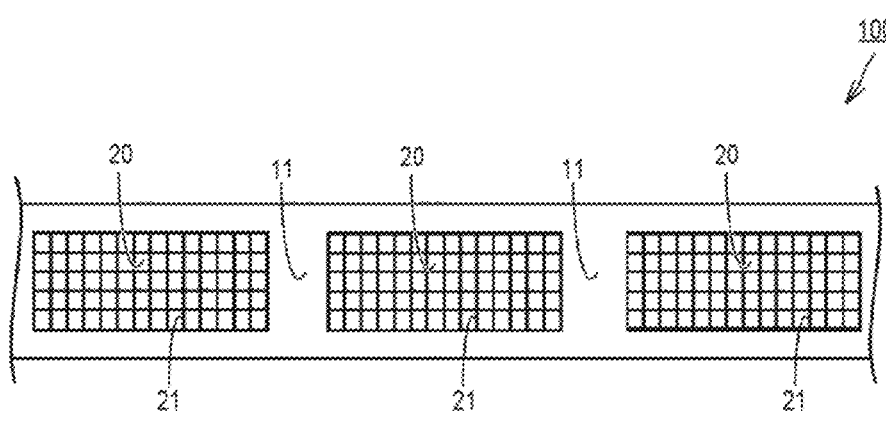
FIG. 11 is a schematic plan view illustrating an example of an electrode in the present embodiment.
Figure 11:
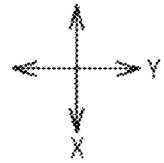

FIG. 11 is a schematic plan view illustrating an example of the electrodes in the present embodiment. Hereinafter, the "electrode in the present embodiment" may be abbreviated as the "present electrode". The present electrode 100 can be manufactured by peeling off the second portion 20b. The present electrode 100 includes the active material layer 20. The active material layer 20 corresponds to the first portion 20a. The active material layer 20 can have a planar shape corresponding to the first region 11a (adhesive layer 12).

Figure 12:
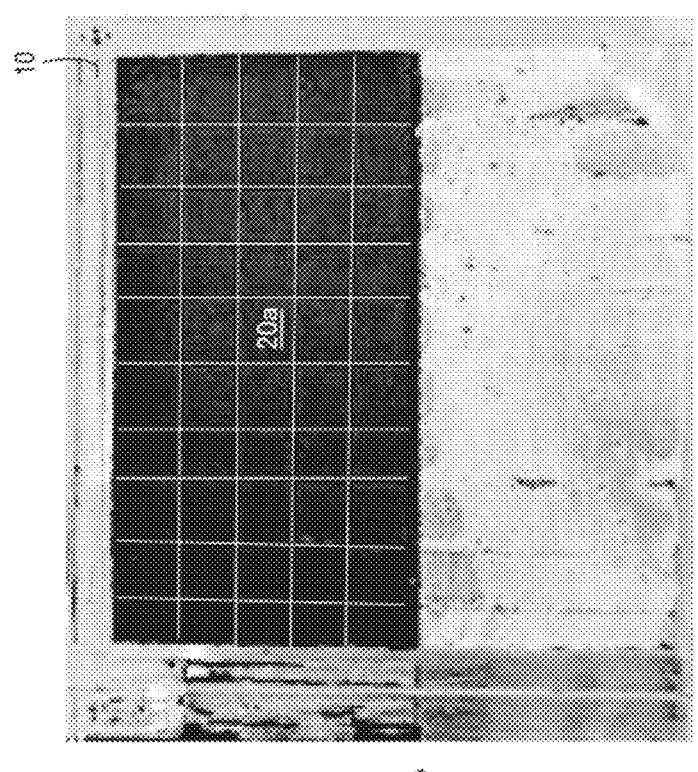
FIG. 12 is an image illustrating an actual partial peeling.
Figure 12:
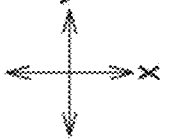
Figure 12:
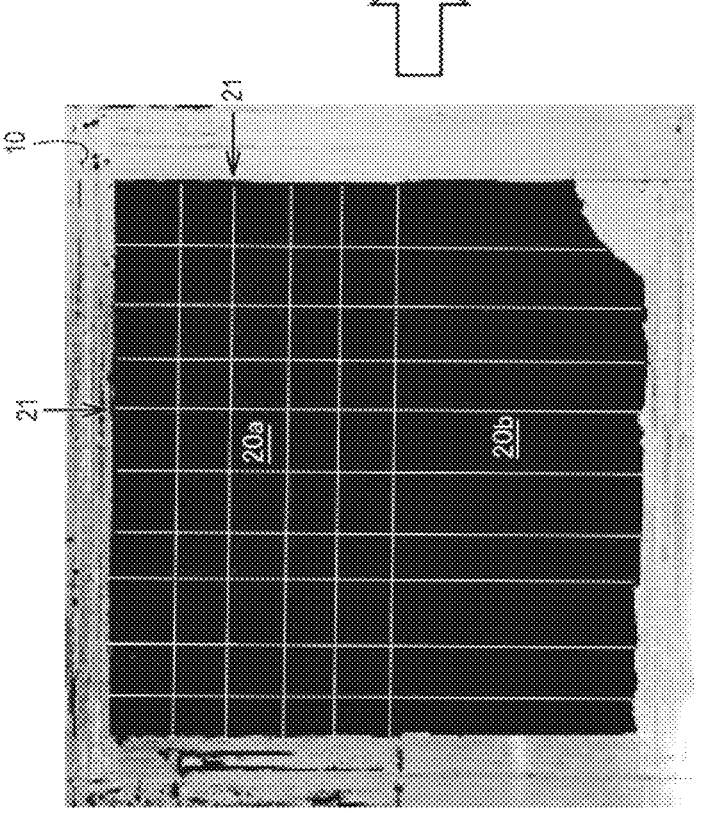

FIG. 12 is an image illustrating an actual partial peeling. The second portion 20b can be peeled off so as to be cut off. After the peeling of the second portion 20b, the disorder of the end portion shape of the first portion 20a is small. The first portion 20a can have a rectangular planar shape. The periphery of the first portion 20a can be straight.

Electrode

Figure 13:
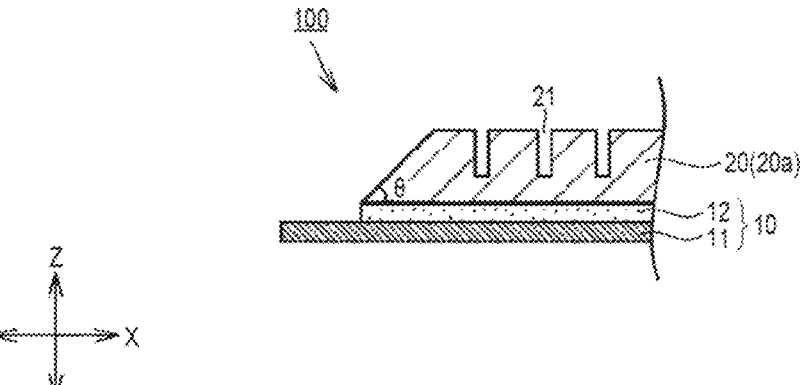
FIG. 13 is a schematic cross-sectional diagram illustrating an electrode in the present embodiment.

FIG. 13 is a schematic cross-sectional view illustrating the electrodes in the present embodiment. The present electrode 100 includes the electrode current collector 10 and the active material layer 20. The active material layer 20 may be arranged on only one side of the electrode current collector 10, or may be arranged on both the front and back sides thereof. The active material layer 20 in FIG. 13 corresponds to the first portion 20a in FIG. 7 and the like. The active material layer 20 covers the adhesive layer 12. The region where the metal foil 11 is exposed corresponds to the second region 11b in FIG. 3 and the like. The groove portion 21 is formed on the surface of the active material layer 20.

The disorder of the end portion shape of the present electrode 100 is small. In the present electrode 100, the active material layer 20 can have a steep end surface. The end surface of the active material layer 20 can have an inclination angle $\theta$ of 45 degrees or more. The inclination angle $\theta$ may be, for example, 60 degrees to 90 degrees or 75 degrees to 90 degrees. It is expected that the energy density improves as the inclination angle $\theta$ approaches 90 degrees.

Figure 14:
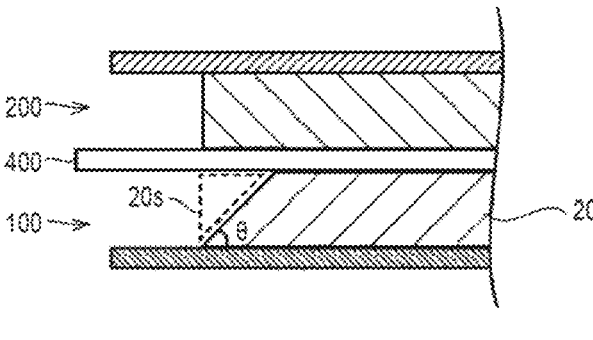
FIG. 14 is a first conceptual diagram illustrating a relationship between an inclination angle of an end surface and an energy density.
Figure 14:
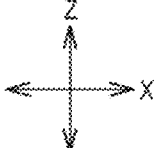
Figure 15:
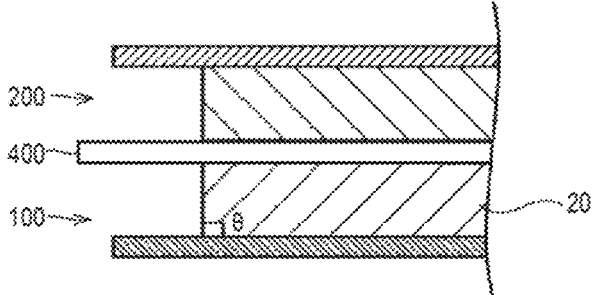
FIG. 15 is a second conceptual diagram illustrating a relationship between an inclination angle of an end surface and an energy density.
Figure 15:
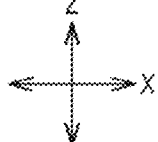

FIG. 14 is a first conceptual diagram illustrating the relationship between the inclination angle of the end surface and the energy density. In FIGS. 14 and 15, the groove portion and the adhesive layer are omitted for convenience. The present electrode 100 faces a counter electrode 200 with a separator 400 interposed therebetween. The counter electrode 200 has the opposite polarity to the present electrode 100. For example, when the present electrode 100 is a positive electrode, the counter electrode 200 is a negative electrode. When the inclination angle $\theta$ of the end surface is small, a dead space 20s may be formed at the end portion of the present electrode 100 at a portion facing the counter electrode 200. The formation of the dead space 20s can reduce the energy density.

FIG. 15 is a second conceptual diagram illustrating the relationship between the inclination angle of the end surface and the energy density. The closer the inclination angle $\theta$ is to 90 degrees, the smaller the dead space 20s can be. That is, it is expected that the energy density improves as the inclination angle $\theta$ approaches 90 degrees.

FIG. 16 is an image indicating an application example of the present embodiment. FIG. 16 illustrates a cross-sectional SEM image of the electrode. The active material layer 20 in FIG. 16 is formed of a wet powder. The end surface of the active material layer 20 is formed by partial peeling of the present embodiment. The active material layer 20 has a steep end surface. The inclination angle of the end surface is 45 degrees or more.

FIG. 17 is an image illustrating a reference form. FIG. 17 illustrates a cross-sectional SEM image of the electrode. The active material layer 20 in FIG. 17 is formed of a slurry. In the reference form, the partial peeling of the present embodiment has not been carried out. Since the slurry has high fluidity, dripping tends to occur at the end portion of the coating film. The dripping can reduce the inclination angle of the end surface. The inclination angle of the end surface is less than 45 degrees.

The present embodiment is exemplary in all respects. The present embodiment is not restrictive. The technical scope of the present disclosure includes the meaning equivalent to the description of the scope of claims and all modifications within the scope thereof. For example, it is planned from the beginning that any configurations may be extracted from the present embodiment and appropriately combined.

What is claimed is:

1. An electrode manufacturing method comprising:
  manufacturing an electrode by:
    forming an active material layer on a surface of an electrode current collector;
    forming a groove portion on a surface of the active material layer; and
    peeling off a part of the active material layer, wherein:
  the electrode current collector includes a metal foil and an adhesive layer;
  in planar view, the metal foil includes a first region and a second region;
  the adhesive layer covers the first region;
  the second region is adjacent to the first region;
  in the second region, the metal foil is exposed;

the active material layer is formed to include a first portion and a second portion;

the second portion is adjacent to the first portion;

the first portion covers the adhesive layer;

the second portion covers the second region;

the groove portion is formed in each of the first portion and the second portion;

a part of the groove portion is formed along a boundary between the first portion and the second portion; and as the part of the active material layer, the second portion is peeled off, wherein the part of the groove portion acts as a cut line of the active material layer when the second portion is peeled off.

2. The electrode manufacturing method according to claim 1, wherein the forming of the active material layer includes:

preparing a wet powder;

processing the wet powder into the active material layer by roll forming; and arranging the active material layer on the surface of the electrode current collector.

3. The electrode manufacturing method according to claim 1, wherein the part of the active material layer is peeled by applying vibration to the second portion.

4. The electrode manufacturing method according to claim 1, wherein the part of the groove portion extends linearly along the boundary.

5. The electrode manufacturing method according to claim 1, wherein the adhesive layer has a thickness of 0.1 µm to 5 µm.

* * * * *